US012220086B2

(12) United States Patent
Chu et al.

(10) Patent No.: US 12,220,086 B2
(45) Date of Patent: Feb. 11, 2025

(54) MICRO PUREE MACHINE WITH ANGLED BOWL

(71) Applicant: SharkNinja Operating LLC, Needham, MA (US)

(72) Inventors: Ping Chu, Needham, MA (US); Nathan Lyell, Surrey (GB); Diego Jasso, New Hope, MN (US); Ryan Michienzi, Cumberland, RI (US); Glen Ruggiero, Needham, MA (US); Thomas Zhang, Shenzhen (CN); Yanfeng Wang, Shenzhen (CN)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/225,358

(22) Filed: Jul. 24, 2023

(65) Prior Publication Data

US 2024/0108174 A1  Apr. 4, 2024

Related U.S. Application Data

(63) Continuation of application No. 17/992,263, filed on Nov. 22, 2022, now Pat. No. 11,759,057, which is a continuation of application No. PCT/CN2022/123016, filed on Sep. 30, 2022.

(51) Int. Cl.
*A47J 43/07* (2006.01)
*A47J 43/044* (2006.01)

(52) U.S. Cl.
CPC ......... *A47J 43/0727* (2013.01); *A47J 43/044* (2013.01); *A47J 43/0705* (2013.01); *A47J 2043/0449* (2013.01)

(58) Field of Classification Search
CPC .. A47J 43/0727; A47J 43/0705; A47J 43/044; A47J 2043/0449; B01F 35/50
USPC ......................................................... 366/197
See application file for complete search history.

(56) References Cited

U.S. PATENT DOCUMENTS

| | | |
|---|---|---|
| 2,815,194 A | 12/1957 | Seyfried |
| 2,829,872 A | 4/1958 | MacDougall |
| D183,532 S | 9/1958 | Raymond |
| 3,630,493 A | 12/1971 | Carpigiani |
| D258,340 S | 2/1981 | Fuchs |

(Continued)

FOREIGN PATENT DOCUMENTS

| | | |
|---|---|---|
| CN | 201345883 | 11/2009 |
| CN | 102805194 | 2/2012 |

(Continued)

OTHER PUBLICATIONS

International Search Report and Written Opinion in Application No. PCT/US2022/053650 dated Jul. 3, 2023, 13 pages.

(Continued)

*Primary Examiner* — Marc C Howell
(74) *Attorney, Agent, or Firm* — The Webb Law Firm

(57) ABSTRACT

A micro puree machine has a drive motor positioned within a lower portion of a housing extending along a vertical axis. A mixing shaft positioned within an upper portion of the housing extends at a non-parallel angle relative to the vertical axis. The bowl of ingredients is installed to an angled surface of the upper portion of the housing along the mixing shaft axis, allowing for easier viewing of the bowl installation.

10 Claims, 6 Drawing Sheets

(56) References Cited

U.S. PATENT DOCUMENTS

| | | | |
|---|---|---|---|
| 4,693,611 A | 9/1987 | Verkler | |
| 4,705,055 A | 11/1987 | Rohm et al. | |
| 4,828,398 A | 5/1989 | Verkler | |
| 5,215,222 A | 6/1993 | McGill | |
| 5,415,534 A | 5/1995 | Bertrand et al. | |
| 5,803,377 A | 9/1998 | Farrell | |
| 6,041,961 A * | 3/2000 | Farrell | B65D 1/265 220/636 |
| 6,250,794 B1 | 6/2001 | Huang | |
| 6,824,303 B2 | 11/2004 | Huang | |
| 7,028,607 B2 | 4/2006 | Zweben | |
| 7,264,160 B2 | 9/2007 | Polarine et al. | |
| 7,451,613 B2 | 11/2008 | Barraclough et al. | |
| 7,993,053 B2 | 8/2011 | McGill | |
| 8,109,714 B2 | 2/2012 | Keener | |
| D655,133 S | 3/2012 | Brinckerhoff et al. | |
| D681,385 S | 5/2013 | Ring et al. | |
| D704,492 S | 5/2014 | Broen et al. | |
| D732,330 S | 6/2015 | Cha et al. | |
| D751,344 S | 3/2016 | Charlton | |
| D751,849 S | 3/2016 | Dunham et al. | |
| 9,351,504 B2 | 5/2016 | Ricco et al. | |
| 9,565,868 B2 | 2/2017 | D'Agostino | |
| D807,691 S | 1/2018 | Connell et al. | |
| 9,968,222 B2 | 5/2018 | Audette | |
| 9,993,015 B2 | 6/2018 | Geng et al. | |
| 10,159,262 B2 | 12/2018 | Dong et al. | |
| 10,299,628 B2 | 5/2019 | Gardner et al. | |
| 10,595,544 B2 | 3/2020 | Beth Halachmi | |
| 10,660,348 B2 | 5/2020 | Cheung | |
| 10,786,119 B2 | 9/2020 | Cheung et al. | |
| 10,794,624 B2 | 10/2020 | Rupp | |
| 10,801,769 B2 | 10/2020 | Rupp | |
| D914,453 S | 3/2021 | Kettavong et al. | |
| 10,995,976 B2 | 5/2021 | Rupp | |
| 11,002,473 B2 | 5/2021 | Rupp | |
| 11,083,320 B2 | 8/2021 | Zhao et al. | |
| 11,154,075 B2 | 10/2021 | Ricco et al. | |
| 11,154,163 B1 | 10/2021 | He et al. | |
| 11,279,609 B2 | 3/2022 | Fonte et al. | |
| 11,291,335 B2 | 4/2022 | Liu et al. | |
| 11,324,358 B1 | 5/2022 | O'Loughlin et al. | |
| 11,337,439 B2 | 5/2022 | Fonte et al. | |
| 11,439,158 B2 | 9/2022 | Farina | |
| 11,470,855 B2 | 10/2022 | Fonte et al. | |
| D979,321 S | 2/2023 | Coakley | |
| 11,583,144 B1 | 2/2023 | Williams et al. | |
| D985,331 S | 5/2023 | He et al. | |
| D985,334 S | 5/2023 | Proulx et al. | |
| 11,759,057 B1 | 9/2023 | Chu et al. | |
| 11,819,814 B1 | 11/2023 | Lyell | |
| 11,844,454 B1 | 12/2023 | Lyell et al. | |
| 11,882,965 B1 | 1/2024 | Chu et al. | |
| D1,019,255 S | 3/2024 | Deng et al. | |
| 2003/0000240 A1 | 1/2003 | Pahl | |
| 2003/0066916 A1 | 4/2003 | Pavlovic et al. | |
| 2004/0042338 A1* | 3/2004 | Wu | H01H 3/16 241/37.5 |
| 2004/0081733 A1 | 4/2004 | Buter et al. | |
| 2004/0161503 A1 | 8/2004 | Malone et al. | |
| 2005/0047272 A1* | 3/2005 | Sands | A47J 43/0716 366/205 |
| 2005/0170054 A1 | 8/2005 | Czark et al. | |
| 2005/0172826 A1 | 8/2005 | Kim | |
| 2005/0173462 A1 | 8/2005 | Stumler et al. | |
| 2006/0255066 A1 | 11/2006 | Kannar et al. | |
| 2007/0056447 A1* | 3/2007 | Swartz | A47J 43/1031 99/287 |
| 2007/0241140 A1 | 10/2007 | Cocchi | |
| 2008/0117714 A1 | 5/2008 | Pavlovic et al. | |
| 2011/0090756 A1 | 4/2011 | Farrell et al. | |
| 2011/0242931 A1* | 10/2011 | Farrell | B65D 1/265 366/197 |
| 2012/0027902 A1 | 2/2012 | Audette et al. | |
| 2012/0048977 A1 | 3/2012 | Machovina et al. | |
| 2012/0096876 A1 | 4/2012 | Ravji et al. | |
| 2013/0344220 A1 | 12/2013 | Farrell et al. | |
| 2014/0130538 A1 | 5/2014 | Bond et al. | |
| 2014/0203127 A1 | 7/2014 | Merl | |
| 2014/0312152 A1 | 10/2014 | Pai | |
| 2015/0201808 A1 | 7/2015 | Katsuki et al. | |
| 2015/0216360 A1 | 8/2015 | Hosner | |
| 2015/0265102 A1* | 9/2015 | Kidd | A47J 43/044 366/331 |
| 2015/0272394 A1 | 10/2015 | Lin et al. | |
| 2017/0112326 A1 | 4/2017 | Ochoa et al. | |
| 2020/0245639 A1 | 8/2020 | Crema et al. | |
| 2020/0260755 A1 | 8/2020 | Harrison et al. | |
| 2021/0055027 A1 | 2/2021 | Rupp | |
| 2021/0068419 A1 | 3/2021 | Spirk et al. | |
| 2021/0106508 A1 | 4/2021 | Akridge et al. | |
| 2021/0120841 A1 | 4/2021 | Kiser et al. | |
| 2021/0204564 A1 | 7/2021 | Bellomare et al. | |
| 2021/0227848 A1 | 7/2021 | Yang et al. | |
| 2021/0274974 A1 | 9/2021 | Abraham et al. | |
| 2021/0371265 A1 | 12/2021 | Fonte et al. | |
| 2022/0202247 A1 | 6/2022 | He et al. | |
| 2022/0202248 A1 | 6/2022 | O'Loughlin et al. | |
| 2022/0202249 A1 | 6/2022 | He et al. | |
| 2022/0202254 A1 | 6/2022 | O'Loughlin | |
| 2022/0225636 A1 | 7/2022 | Minard et al. | |
| 2022/0225831 A1 | 7/2022 | He et al. | |
| 2022/0408977 A1 | 12/2022 | Deng et al. | |
| 2023/0010316 A1 | 1/2023 | White et al. | |
| 2023/0301467 A1 | 9/2023 | Proulx et al. | |

FOREIGN PATENT DOCUMENTS

| | | |
|---|---|---|
| CN | 103168908 | 6/2013 |
| CN | 103181715 | 7/2013 |
| CN | 203088680 | 7/2013 |
| CN | 203152409 | 8/2013 |
| CN | 203233980 | 10/2013 |
| CN | 204362865 | 6/2015 |
| CN | 110168296 | 8/2019 |
| CN | 210642278 | 6/2020 |
| CN | 112042801 | 12/2020 |
| CN | 112469283 | 3/2021 |
| CN | 112512393 | 3/2021 |
| CN | 105828630 | 5/2021 |
| CN | 216282190 | 4/2022 |
| EP | 0314209 | 5/1989 |
| EP | 0891139 | 1/1999 |
| EP | 0995685 | 4/2000 |
| EP | 1495682 | 1/2005 |
| EP | 1586259 A1 | 10/2005 |
| EP | 1689250 | 8/2006 |
| EP | 2380474 A2 | 10/2011 |
| EP | 3060069 | 8/2016 |
| EP | 3535532 | 9/2019 |
| EP | 3616528 | 3/2020 |
| EP | 3692873 A1 | 8/2020 |
| EP | 3755160 | 12/2020 |
| EP | 3801042 | 4/2021 |
| EP | 3944796 A1 | 2/2022 |
| ES | 1071424 | 2/2010 |
| FR | 2585588 A1 | 2/1987 |
| IT | 202000005641 A2 | 9/2021 |
| JP | H01-11029 | 3/1989 |
| WO | 2005048745 | 6/2005 |
| WO | 2005070271 | 8/2005 |
| WO | 2015061364 | 4/2015 |
| WO | 2018085442 | 5/2018 |
| WO | 2018085443 A1 | 5/2018 |
| WO | 2019117804 | 6/2019 |
| WO | 2019146834 | 8/2019 |
| WO | 2019200491 | 10/2019 |
| WO | 2019224859 | 11/2019 |
| WO | 2020227235 A1 | 11/2020 |
| WO | 2021186353 A1 | 9/2021 |
| WO | 2022020653 | 1/2022 |

(56) References Cited

FOREIGN PATENT DOCUMENTS

OTHER PUBLICATIONS

International Search Report and Written Opinion in Application No. PCT/CN2022/123016 dated Mar. 31, 2023, 11 pages.
International Search Report and Written Opinion in Application No. PCT/CN2022/123017 dated Mar. 23, 2023, 12 pages.
International Search Report and Written Opinion in Application No. PCT/US2022/054361 dated Aug. 9, 2023, 14 pages.
International Search Report and Written Opinion in Application No. PCT/US2022/054363 dated Aug. 9, 2023, 15 pages.
KIDISLE 3 in 1 Single Serve Coffee Maker. Date earliest reviewed on Amazon.com Apr. 19, 2023. https://www.amazon.com/KIDISLE-Removable-Reservoir-Self-cleaning-Function/dp/B0CB5PM PQX/ref (Year: 2023), 1 page.

* cited by examiner

MICRO PUREE MACHINE WITH ANGLED BOWL

CROSS-REFERENCE TO RELATED APPLICATIONS

This application is a continuation of co-pending U.S. application Ser. No. 17/992,263, filed on Nov. 22, 2022, entitled MICRO PUREE MACHINE WITH ANGLED BOWL, which in turn is a continuation of International Application No. PCT/CN2022/123016, filed on Sep. 30, 2022, the entire contents of which are incorporated herein by reference for all purposes.

FIELD OF THE INVENTION

The present disclosure relates to a food processing device and, more particularly, to a micro puree machine for making frozen foods and drinks.

BACKGROUND

Home use machines that are intended to make ice creams, gelatos, frozen yogurts, sorbets and the like are known in the art. Typically, a user adds a series of non-frozen ingredients to a beaker. The ingredients are then churned by a paddle while a refrigeration mechanism simultaneously freezes the ingredients. These devices have known shortcomings including, but not limited to, the amount of time and effort required by the user to complete the ice cream making process. Machines of this nature are impractical for preparing most non-dessert food products.

An alternative type of machine known to make a frozen food product is a micro-puree machine. Typically, machines of this nature spin and plunge a blade into a pre-frozen ingredient or combination of ingredients. While able to make frozen desserts like ice creams, gelatos, frozen yogurts, sorbets and the like, micro puree style machines can also prepare non-dessert types of foods such as non-dessert purees and mousses. In addition, consumers can prepare either an entire batch of ingredients or a pre-desired number of servings.

Some current micro puree machines require the user to install the bowl holding the pre-frozen ingredients on the housing of the machine in a manner that causes the upper housing of the machine to partially block the user's view of the bowl. This makes it more difficult for the user to assemble the bowl to the housing for processing the ingredients.

Furthermore, some micro puree machines have a supporting base that supports a bowl holding the frozen ingredients. In some cases, the bowl has a lid to which a blade can be attached, and then the bowl can be secured to the base, and the base can be raised until the blade engages with a blade shaft included within the housing. In some cases, a first bowl holds the frozen ingredients, and the first bowl is inserted into a second bowl that is secured to the base and has the lid to which the blade is attached. Thus, in some known micro puree systems, multiple bowls are used, and the process for making a frozen food product includes: inserting a first bowl including ingredients into a second bowl; attaching a blade to a lid of the second bowl, attaching the lid to the second bowl; securing the second bowl on a supporting base; and raising the based until the blade engages a blade shaft of the housing.

SUMMARY

It may be desirable to have a micro puree system for which only a single bowl is required, for which it is easier to assemble such bowl to a housing of the micro puree system than known systems, and for which fewer steps are required to use such bowl to produce a frozen food product than in known systems.

The disclosure describes a micro puree machine that allows a user to install the bowl of ingredients at an angle relative to a vertical axis of the machine. A drive motor positioned within a lower portion of a housing extends along the vertical axis, while a mixing shaft positioned within an upper portion of the housing extends at a non-parallel angle relative to the vertical axis. The bowl of ingredients is installed to an angled surface on the upper portion of the housing along the mixing shaft axis, advantageously allowing for easier viewing of the bowl installation.

Embodiments of the micro puree machine of this disclosure may include one or more of the following, in any suitable combination.

In embodiments, a micro puree machine of this disclosure includes a housing having a lower portion and an upper portion. A drive motor is positioned within the lower portion of housing. The drive motor extends along a first axis. A mixing shaft operatively coupled to the drive motor is positioned within the upper portion of the housing. The mixing shaft extends along a second axis. A bowl is rotatably assembleable to a coupling on the upper portion of the housing such that the bowl extends along the second axis. The second axis extends in a non-parallel direction relative to the first axis.

In further embodiments, an outer surface of the bowl has at least one projection for engaging an indentation on an inner surface of the coupling when the bowl is rotated relative to the coupling. In embodiments, the coupling defines at least one notch engageable with the at least one projection for aligning the bowl in a predetermined orientation relative to the indentation. In embodiments, the coupling further includes a backing member extending toward a base of the micro puree machine. In embodiments, the second axis extends at about a 45 degree angle to about a 55 degree angle relative to the first axis. In embodiments, the micro puree machine further includes a blade coupleable to the mixing shaft for rotation about the second axis. In embodiments, the micro puree machine includes a lid coupleable to the bowl. The lid is configured to receive the blade therein. In embodiments, the upper portion of the housing includes an angled surface, and the coupling is located on the angled surface. In embodiments, the second axis extends perpendicular to the angled surface. In embodiments, the upper portion of the housing includes a position motor for moving the mixing shaft axially along the second axis.

In embodiments, a method of assembling a bowl to a micro puree machine of this disclosure includes rotating the bowl relative to a coupling on an upper portion of a housing of the micro puree machine. The micro puree machine further includes a lower portion of the housing. A drive motor is positioned within the lower portion and extends along a first axis. A mixing shaft operatively couples to the drive motor and is positioned within the upper portion of the housing. The mixing shaft extends along a second axis. The second axis extends in a non-parallel direction relative to the first axis. Rotating the bowl relative to the coupling locks the bowl to the coupling such that the bowl extends along the second axis. The method of assembling a bowl to a micro puree machine may include: positioning a drive motor within a lower portion of a housing of the micro puree machine; extending the drive motor along a first axis; coupling a mixing shaft to the drive motor; positioning the mixing shaft within the upper portion of the housing; extending the mixing shaft along a second axis; and rotating the bowl relative to a coupling on an upper portion of a housing, where rotating the bowl relative to the coupling locks the bowl to the coupling such that the bowl extends along the second axis and where the second axis extends in a non-parallel direction relative to the first axis.

In further embodiments, the method further includes engaging a projection on an outer surface of the bowl with a corresponding indentation on an inner surface of the coupling when the bowl is rotated relative to the coupling. In embodiments, the coupling defines at least one notch engageable with the projection for aligning the bowl in a predetermined orientation relative to the indentation. In embodiments, the coupling further includes a backing member extending toward a base of the micro puree machine. In embodiments, the second axis extends at about a 45 degree angle to about a 55 degree angle relative to the first axis. In embodiments, the lower portion of the housing extends between the upper portion and a base of the housing. In embodiments, the method further includes coupling a blade to the mixing shaft for rotation about the second axis. In embodiments, the method further includes coupling a lid to the bowl. The lid is configured to receive the blade therein. In embodiments, the upper portion of the housing includes an angled surface, and the coupling is located on the angled surface. In embodiments, the second axis extends perpendicular to the angled surface.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
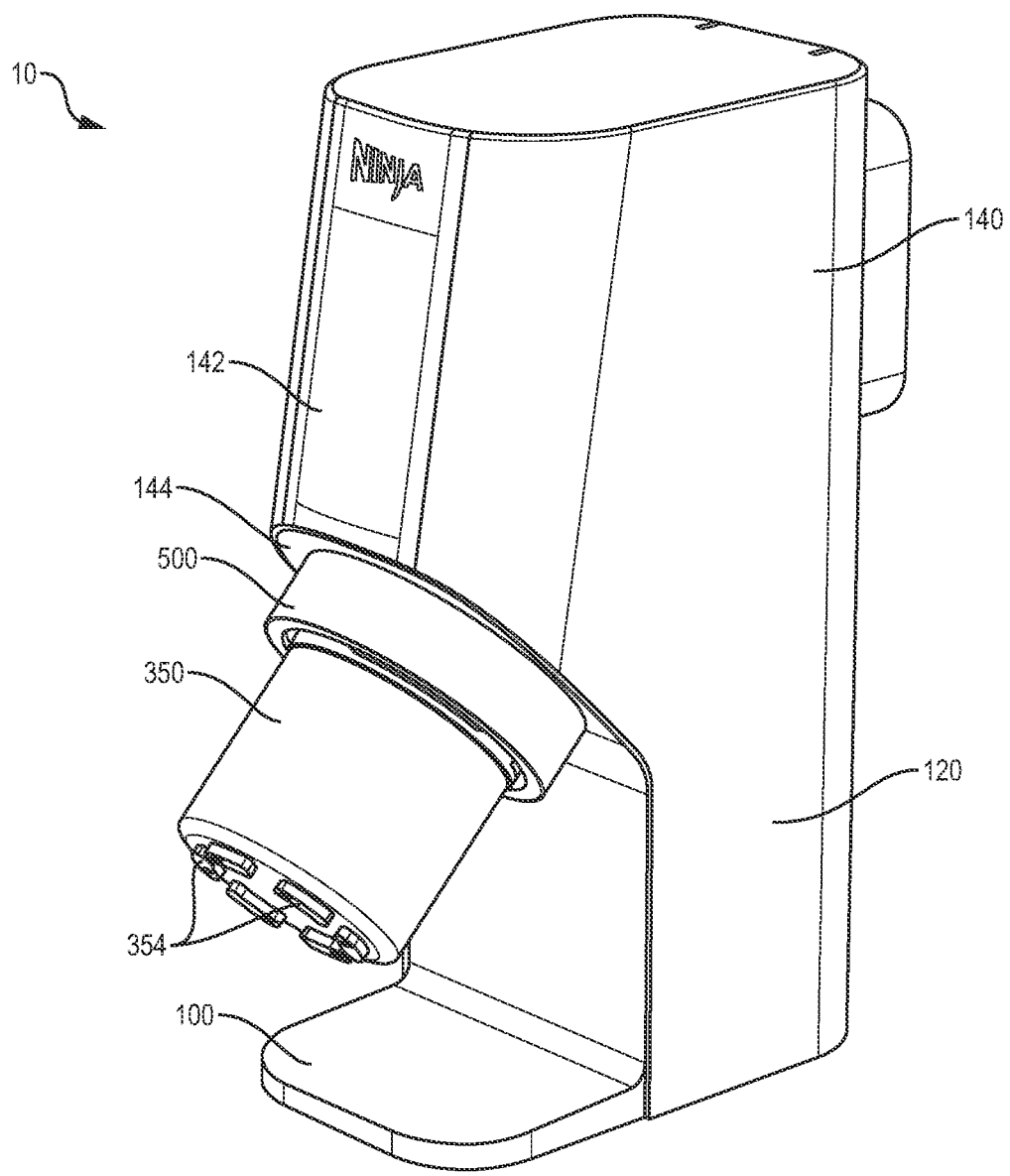
FIGS. 1 and 2 show a micro puree machine according to some embodiments of this disclosure.

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the feed chute assembly in any manner.

Figure 2:
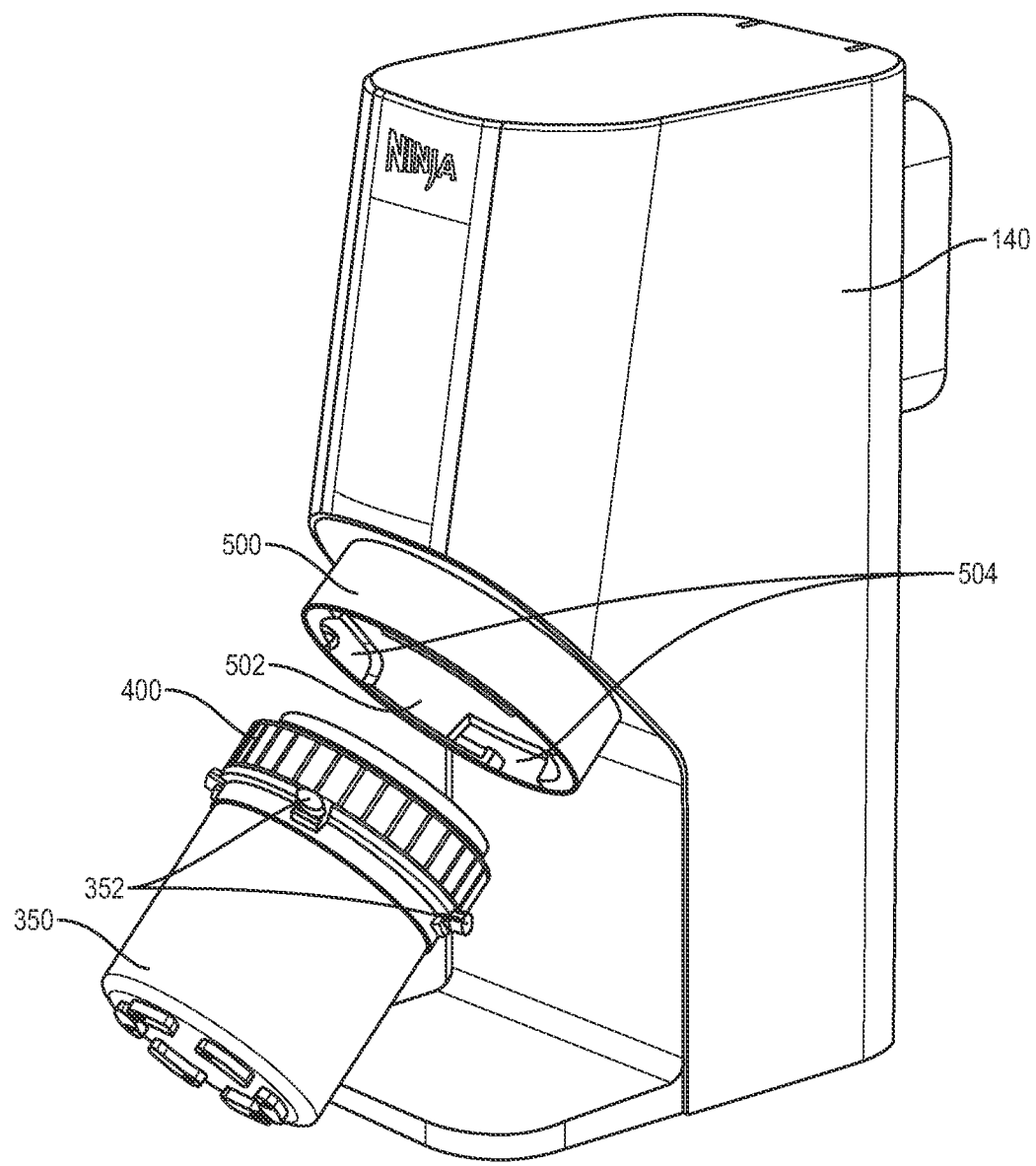

FIG. 1 shows an isometric view of a micro puree machine 10 according to an illustrative embodiment of the present disclosure. The micro puree machine 10 may include a base 100 and an upper housing 140. A middle housing 120 may extend between the base 100 and the upper housing 140. The upper housing 140 may include an interface 142 for receiving user inputs to control the micro puree machine 10 and/or display information. The micro puree machine 10 may also include a removable bowl 350 and lid 400 (FIG. 2). The bowl 350 may contain one or more pre-frozen ingredients for processing. A user may couple the bowl 350 to a coupling 500 on an angled surface 144 of the upper housing 140 by rotating the bowl 350 relative to the coupling 500, as further described below. In embodiments, the bowl 350 may include features 354 on the bottom surface of the bowl 350 to aid in the fixing of frozen ingredients within the bowl 350. The features 354 may prevent such frozen ingredients from rotational movement within the bowl 350 during use. In embodiments, the bowl 350 can be manufactured from a disposable material to enhance the convenience of using the micro puree machine 10. Further, the bowl 350 can be sold as a stand-alone item and can also be prefilled with ingredients to be processed during use of the micro puree machine 10.

FIG. 2 shows the micro puree machine 10 of FIG. 1 with the bowl 350 and the lid 400 disassembled from the upper housing 140 according to some embodiments. As shown in FIG. 2, an inner surface 502 of the coupling 500 may comprise locating and locking elements for positioning and connecting the bowl 350 to the coupling 500. For example, the inner surface 502 of the coupling 500 may comprise one or more corresponding indentations 504 sized to receive at least one projection 352 on an outer surface of the bowl 350. In embodiments, the at least one projection 352 may be four projections 352 spaced 90 degrees apart about an outer surface of the bowl 350. However, the disclosure contemplates more or fewer than four projections 352. The user may rotate the bowl 350 relative to the coupling 500 such that the projections 352 are rotated into the indentations 504, locking the bowl 350 and the coupling 500 together.

Figure 3:
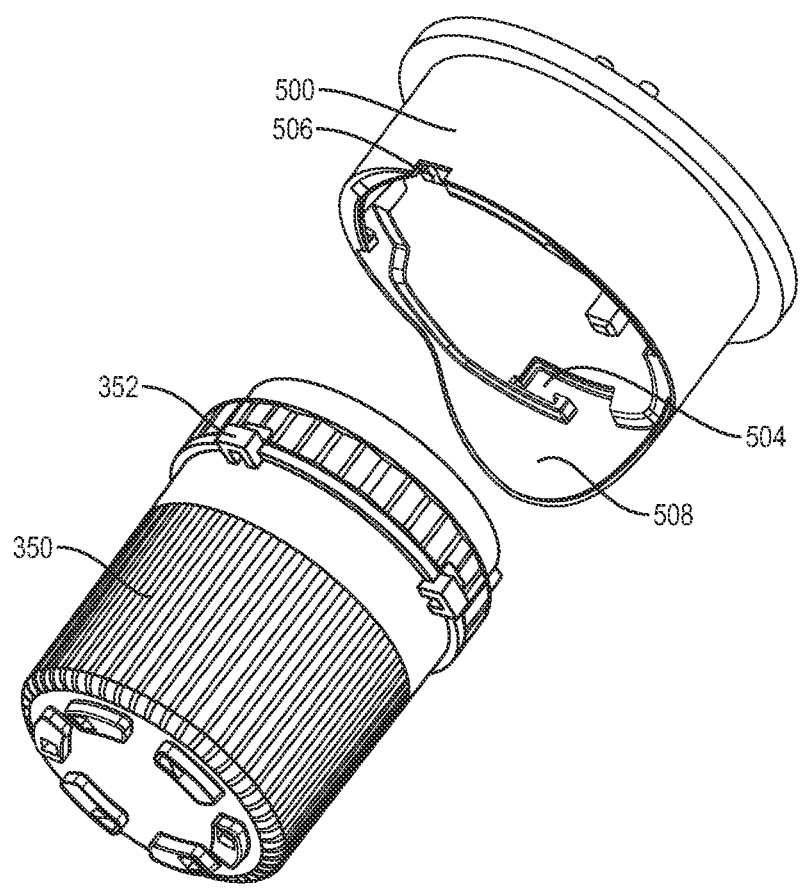
FIG. 3 illustrates a detailed view of the bowl and coupling of FIGS. 1 and 2 according to some embodiments.

FIG. 3 illustrates a detailed view of the coupling 500 according to some embodiments. As shown in FIG. 3, the coupling 500 may additionally include a notch 506 adjacent one of the indentations 504 to help the user align a projection 352 on the bowl 350 to the indentation 504. This helps the user present the bowl 350 to the coupling 500 in the correct installation orientation. Embodiments of the coupling 500 may further include a backing member 508 extending toward the base 100 to help the user align the bowl 350 concentrically with the indentations 504 when installing the bowl 350 on the upper housing 140.

Figure 4:
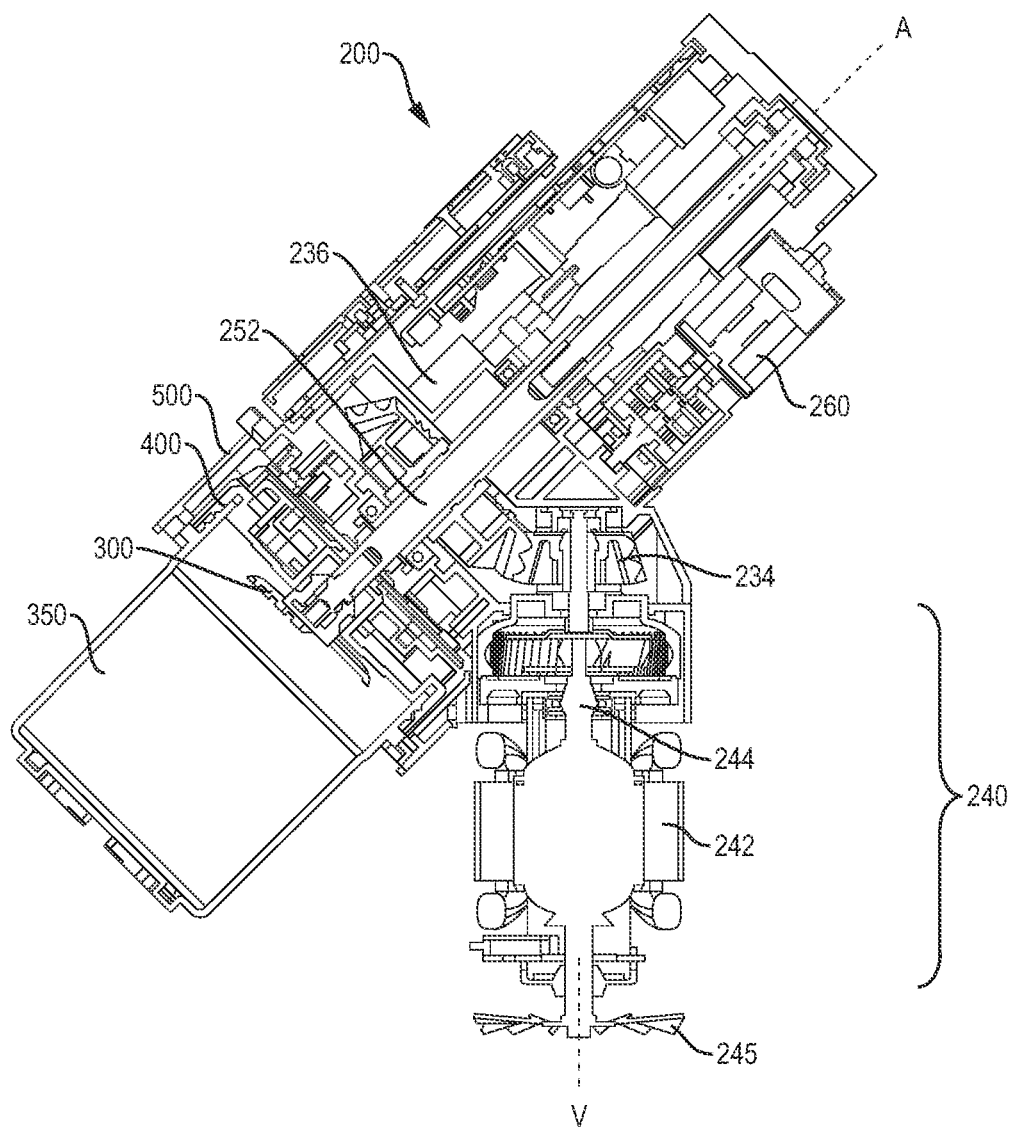
FIG. 4 illustrates a cross-sectional view of the transmission assembly of FIGS. 1 and 2 according to some embodiments.

FIG. 4 illustrates a transmission assembly 200 of the micro puree machine 10 according to some embodiments of this disclosure. In embodiments, the transmission assembly 200 may generally include a mixing shaft 252, a position motor 260, and drive motor assembly 240. The mixing shaft 252 may extend through the upper housing 140 along a mixing shaft axis A that is perpendicular to the angled surface 144 of the upper housing 140 (FIG. 1). The position motor 260 may be disposed in the upper housing 140 and operatively coupled to the mixing shaft 252 to move the mixing shaft 252 along the mixing shaft axis A. The drive motor assembly 240 may be disposed in the middle housing 120 and include a drive motor housing 242 and a drive motor 244. The drive motor 244 may extend through the middle housing 120 along a vertical axis V. The drive motor assembly 240 may also include a first gear 234 for engaging a second gear 236 of the mixing shaft 252 to rotate the mixing shaft 252 about the mixing shaft axis A. The drive motor assembly 240 may further include a fan 245 attached to the drive motor 244.

Figure 5A:
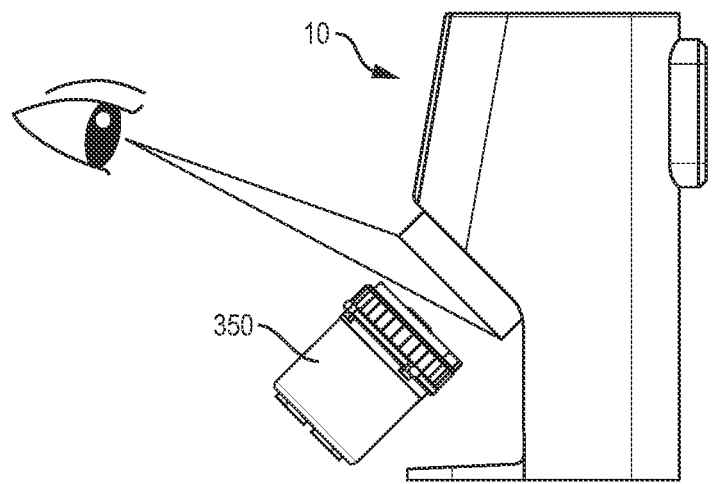
FIGS. 5A and 5B illustrate the installation angle of the bowl of FIGS. 1 and 2 (FIG. 5A) compared to other installation angles (FIG. 5B)
Figure 5B:
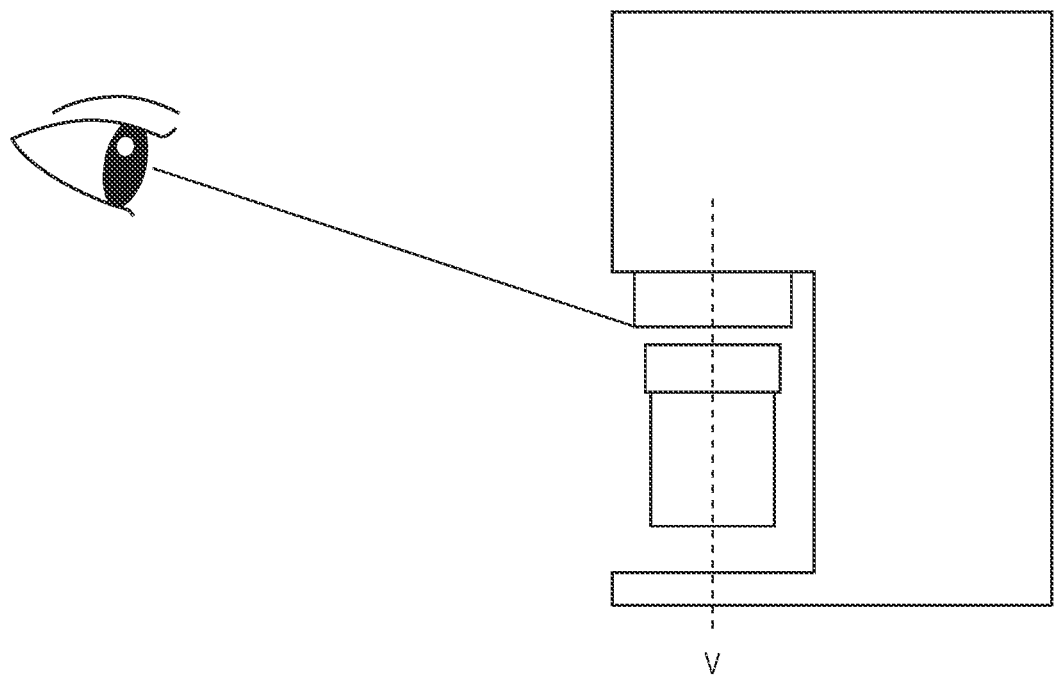

In embodiments, the mixing shaft axis A may extend in a non-parallel direction relative to the vertical axis V. For example, the mixing shaft axis A may extend about a 45 degree to about a 55 degree angle relative to the vertical axis V. Furthermore, the mixing shaft axis A may extend perpendicular to the angled surface 144 such that the bowl 350 may be installed to the upper housing 140 along the mixing shaft axis. A. When the bowl 350 is assembled to the upper housing 140, a blade 300 inserted into the lid 400 may be attachable to the mixing shaft 252. Thus, actuation of the position motor 260 and the drive motor 244, either manually via the interface 142, may cause both rotation of the mixing shaft 252 and the blade 300 about the mixing the shaft axis A and positioning of the mixing shaft 252 and the blade 300 along the mixing shaft axis A to engage with ingredients inside the bowl 350. Advantageously, as shown in FIG. 5A, the angle of installation may allow for easier viewing by the user to assemble the bowl 350 to the micro puree machine 10 compared to devices where the bowl is installed on the vertical axis V (FIG. 5B).

Figure 6:
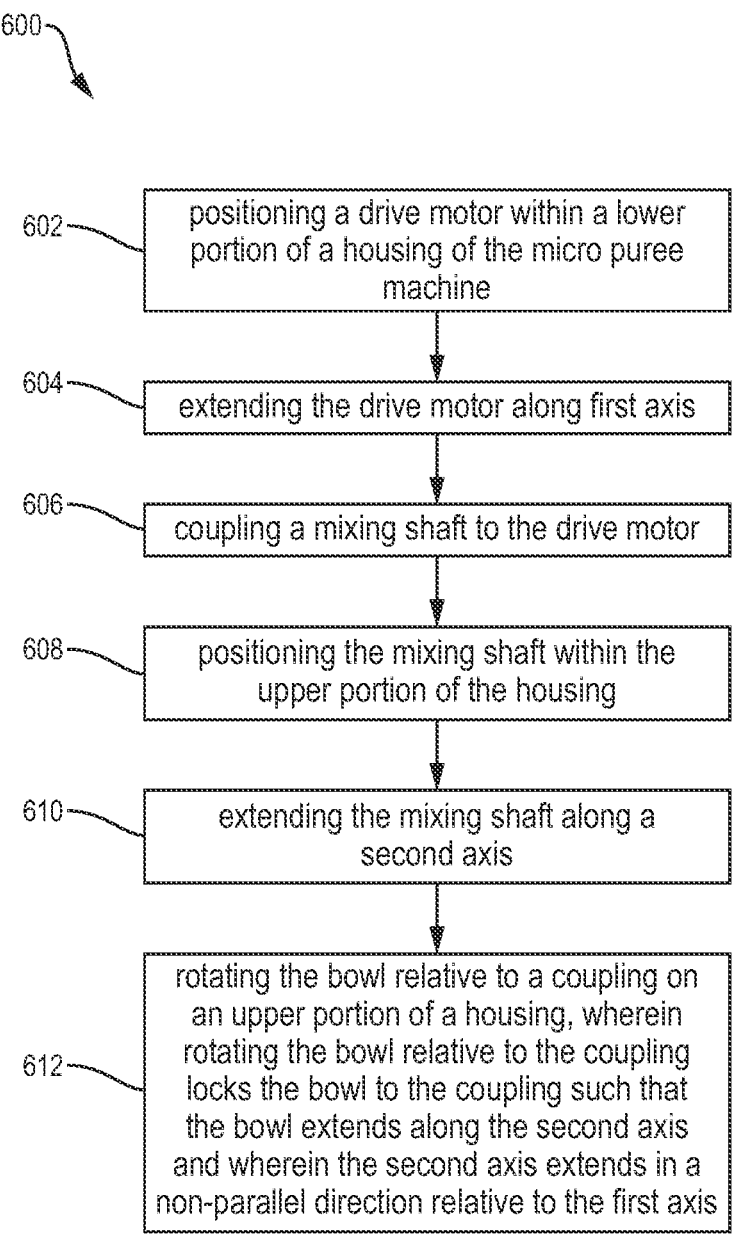
FIG. 6 shows a process for assembling a bowl to a micro puree machine.

FIG. 6 shows a process 600 for assembling a bowl to a micro puree machine. Process 600 includes: positioning a drive motor within a lower portion of a housing of the micro puree machine (Step 602); extending the drive motor along a first axis (Step 604); coupling a mixing shaft to the drive motor (Step 606); positioning the mixing shaft within the upper portion of the housing (Step 608); extending the mixing shaft along a second axis (Step 610); and rotating the bowl relative to a coupling on an upper portion of a housing, where rotating the bowl relative to the coupling locks the bowl to the coupling such that the bowl extends along the second axis and where the second axis extends in a non-parallel direction relative to the first axis (Step 612). Such a bowl assembly process, where the mixing shaft is extended in a non-parallel direction with respect to the drive motor, facilitates more efficient, reliable, and convenient handling and/or assembly of the bowl to the housing by a user because the bowl may be more easily aligned and rotated by a user to engage with the coupling on the upper housing. Further, in contrast to some known micro puree systems, embodiments of the bowl assembly process described herein use only a single bowl that holds the ingredients and is assembled to the housing. What's more, such a process does not include securing a bowl to a supporting base or raising the base to assemble the bowl to the housing, as required in some known micro puree systems.

While the disclosure particularly shows and describes preferred embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. A beaker for use with a micro puree machine, the beaker comprising:
   a first open end configured to receive a blade of the micro puree machine;
   a second closed end having an exterior bottom surface, the exterior bottom surface having an outer circumference; and
   a sidewall extending between the first open end and the second closed end to define an interior volume configured to receive ingredients through the first open end;
   wherein the exterior bottom surface includes a plurality of fixation features, each of the plurality of fixation features having a longitudinal axis, the plurality of fixation features being arranged about a circular axis on the exterior bottom surface such that the longitudinal axis of each of the plurality of fixation features extends along the circular axis, each of the plurality of fixation features being spaced apart from the outer circumference of the exterior bottom surface and from each other fixation feature of the plurality of fixation features, and
   wherein an outer surface of the sidewall comprises at least one projection configured to engage an indentation on an inner surface of the micro puree machine when the beaker is rotated relative to the inner surface.

2. The beaker of claim 1, wherein the plurality of fixation features are positioned closer to the outer circumference of the exterior bottom surface than to a central axis of the beaker.

3. The beaker of claim 1, wherein the plurality of fixation features are generally oblong in shape.

4. The beaker of claim 1, wherein the plurality of fixation features comprises at least three features.

5. The beaker of claim 1, wherein the plurality of fixation features is six features.

6. The beaker of claim 1, wherein the second closed end has a circular shape, and wherein the plurality of fixation features are disposed in a non-overlapping pattern about the outer circumference of the exterior bottom surface.

7. The beaker of claim 6, wherein the plurality of fixation features are disposed in an annular pattern about the outer circumference of the exterior bottom surface.

8. The beaker of claim 1, wherein the beaker is configured to couple to a lid.

9. The beaker of claim 1, wherein the beaker is manufactured from a disposable material.

10. The beaker of claim 1, wherein the at least one projection is four projections spaced 90 degrees apart about a circumference of the outer surface.

* * * * *